US011061382B2

(12) United States Patent
Detor et al.

(10) Patent No.: US 11,061,382 B2
(45) Date of Patent: Jul. 13, 2021

(54) METHODS OF FORMING ELECTROFORMED COMPONENTS AND RELATED SYSTEM

(71) Applicant: GENERAL ELECTRIC COMPANY, Schenectady, NY (US)

(72) Inventors: Andrew Joseph Detor, Burnt Hills, NY (US); Pei-Hsin Kuo, Alplaus, NY (US)

(73) Assignee: General Electric Company, Schenectady, NY (US)

( * ) Notice: Subject to any disclaimer, the term of this patent is extended or adjusted under 35 U.S.C. 154(b) by 121 days.

(21) Appl. No.: 16/223,131

(22) Filed: Dec. 18, 2018

(65) Prior Publication Data

US 2020/0192328 A1  Jun. 18, 2020

(51) Int. Cl.
*C25D 21/12* (2006.01)
*G05B 19/408* (2006.01)
(Continued)

(52) U.S. Cl.
CPC ......... *G05B 19/4083* (2013.01); *C25D 1/003* (2013.01); *C25D 21/12* (2013.01);
(Continued)

(58) Field of Classification Search
CPC ...... G05B 19/4083; G05B 2219/33034; G05B 2219/49007; G06N 20/00; C25D 1/003; C25D 21/12
See application file for complete search history.

(56) References Cited

U.S. PATENT DOCUMENTS 6,200,450 B1   3/2001  Hui
6,350,361 B1   2/2002  Sexton et al.
(Continued)

FOREIGN PATENT DOCUMENTS

CN   202323092 U   7/2012
CN   101880899 B   9/2012
EP     0022113 B1   7/1984

OTHER PUBLICATIONS

Hernandez et al., "Computer Aided Electroforming. Elecform3D", 2013, Procedia Engineering, vol. 63, pp. 532-539 (Year : 2013).*
(Continued)

*Primary Examiner* — Mohammad Ali
*Assistant Examiner* — Vincent W Chang
(74) *Attorney, Agent, or Firm* — McGarry Bair PC

(57) ABSTRACT

A method of forming a component by an electroforming process using an electroforming apparatus is presented. The electroforming apparatus includes an anode, a cathode and an electrolyte including a metal salt. The method includes receiving a set of training electroforming process parameters; training a machine learning algorithm based on at least a subset of the set of training electroforming process parameters; generating a set of updated operating electroforming parameters from the trained machine learning algorithm; and operating the electroforming apparatus based on the set of updated operating electroforming parameters. The step of operating the electroforming apparatus includes applying an electric current between the anode and the cathode in the presence of the electrolyte and depositing a plurality of metal layers on a cathode surface to form the component. A system of forming a component is also presented.

18 Claims, 12 Drawing Sheets

(51) Int. Cl.
  *G06N 20/00* (2019.01)
  *C25D 1/00* (2006.01)
(52) U.S. Cl.
  CPC ... *G06N 20/00* (2019.01); *G05B 2219/33034* (2013.01); *G05B 2219/49007* (2013.01)

(56) References Cited

U.S. PATENT DOCUMENTS

| | | | |
|---|---|---|---|
| 8,808,521 B2 | 8/2014 | Zhou | |
| 2003/0042135 A1* | 3/2003 | Katsumaru | C25D 13/22 |
| | | | 204/229.8 |
| 2006/0177566 A1 | 8/2006 | Price | |
| 2016/0306068 A1* | 10/2016 | Deinert | G01N 23/083 |
| 2017/0145578 A1* | 5/2017 | Wirth | C25D 1/003 |
| 2019/0360116 A1* | 11/2019 | Collinson | G01N 27/42 |

OTHER PUBLICATIONS

Chan et al., "Application of a hybrid case-based reasoning approach in electroplating industry", Expert Systems with Applications, vol. 29, China, 2005,pp. 121-130.

Castellano et al., "Computer Aided Electroforming for Rapid Manufacturing Applications", ASME 2012 11th Biennial Conference on Engineering Systems Design and Analysis, vol. 4, France, 2012,pp. 147-154.

\* cited by examiner

METHODS OF FORMING ELECTROFORMED COMPONENTS AND RELATED SYSTEM

BACKGROUND

Embodiments of the disclosure generally relate to methods and systems of forming electroformed components. More particularly, embodiments of the disclosure relate to methods and systems of forming electroformed components with complex geometry.

Electroforming is an additive manufacturing process where metal components are formed through electrolytic reduction of metal ions (atom by atom) on the surface of a mandrel (cathode). Electroforming is used to manufacture products across a range of industries including healthcare, electronics, and aerospace. Electroforming manufacturing process can offer several advantages including efficiency, precision, scalability, or cost-effectiveness. However, electroforming of components having complex shapes may pose technical challenges. For example, components having significant curvature, tight corners, lack of symmetry, recessed or even internal features, may pose difficulties in setting up the process to yield consistent and controllable part thickness.

Accordingly, there remains a need for improved methods of manufacturing electroformed components, particularly for electroforming of components with complex geometry.

BRIEF DESCRIPTION

In one aspect of the description, a method of forming a component by an electroforming process using an electroforming apparatus is presented. The electroforming apparatus includes an anode, a cathode and an electrolyte including a metal salt. The method includes receiving a set of training electroforming process parameters; training a machine learning algorithm based on at least a subset of the set of training electroforming process parameters; generating a set of updated operating electroforming parameters from the trained machine learning algorithm; and operating the electroforming apparatus based on the set of updated operating electroforming parameters. The step of operating the electroforming apparatus includes applying an electric current between the anode and the cathode in the presence of the electrolyte, and depositing a plurality of metal layers on a cathode surface to form the component.

In another aspect of the description, a method of forming a component by an electroforming process using an electroforming apparatus is presented. The electroforming apparatus includes an anode, a cathode and an electrolyte including a metal salt. The method includes receiving a set of training electroforming process parameters including coordinates of the anode, orientation states of the anode, or a combination thereof; training a machine learning algorithm based on at least a subset of the set of training electroforming process parameters; generating a set of updated operating electroforming parameters from the trained machine learning algorithm, wherein the set of updated operating parameters includes updated coordinates of the anode, updated orientation states of the anode, or a combination thereof; and operating an electroforming apparatus based on the set of updated operating electroforming parameters. The step of operating the electroforming apparatus includes: moving, using a robotic assembly, the anode, based on the set of updated operating electroforming parameters, applying an electric current between the anode and the cathode in the presence of the electrolyte, after each movement of anode, and depositing a plurality of metal layers on a cathode surface to form the component.

In yet another aspect of the description, a system for electroforming a component, is also presented. The system includes an electroforming apparatus and a controller operatively coupled to the electroforming apparatus. The electroforming apparatus includes an anode, a cathode and an electrolyte including a metal salt. The controller includes a memory storing one or more processor-executable routines and a machine learning algorithm. The controller further includes one or more processors to execute the one or more processor-executable routines which, when executed, cause acts to be performed. The acts to be performed include: receiving a set of training electroforming process parameters; training a machine learning algorithm based on at least a subset of the set of training electroforming process parameters; generating a set of updated operating electroforming parameters from the trained machine learning algorithm; and operating the electroforming apparatus based on the set of updated operating electroforming parameters. Further, operating the electroforming apparatus includes: applying an electric current between the anode and the cathode in the presence of the electrolyte, and depositing a plurality of metal layers on a cathode surface to form the component.

BRIEF DESCRIPTION OF THE DRAWINGS

These and other features, aspects, and advantages of the present disclosure will become better understood when the following detailed description is read with reference to the accompanying drawings, wherein.

DETAILED DESCRIPTION

Figure 1:
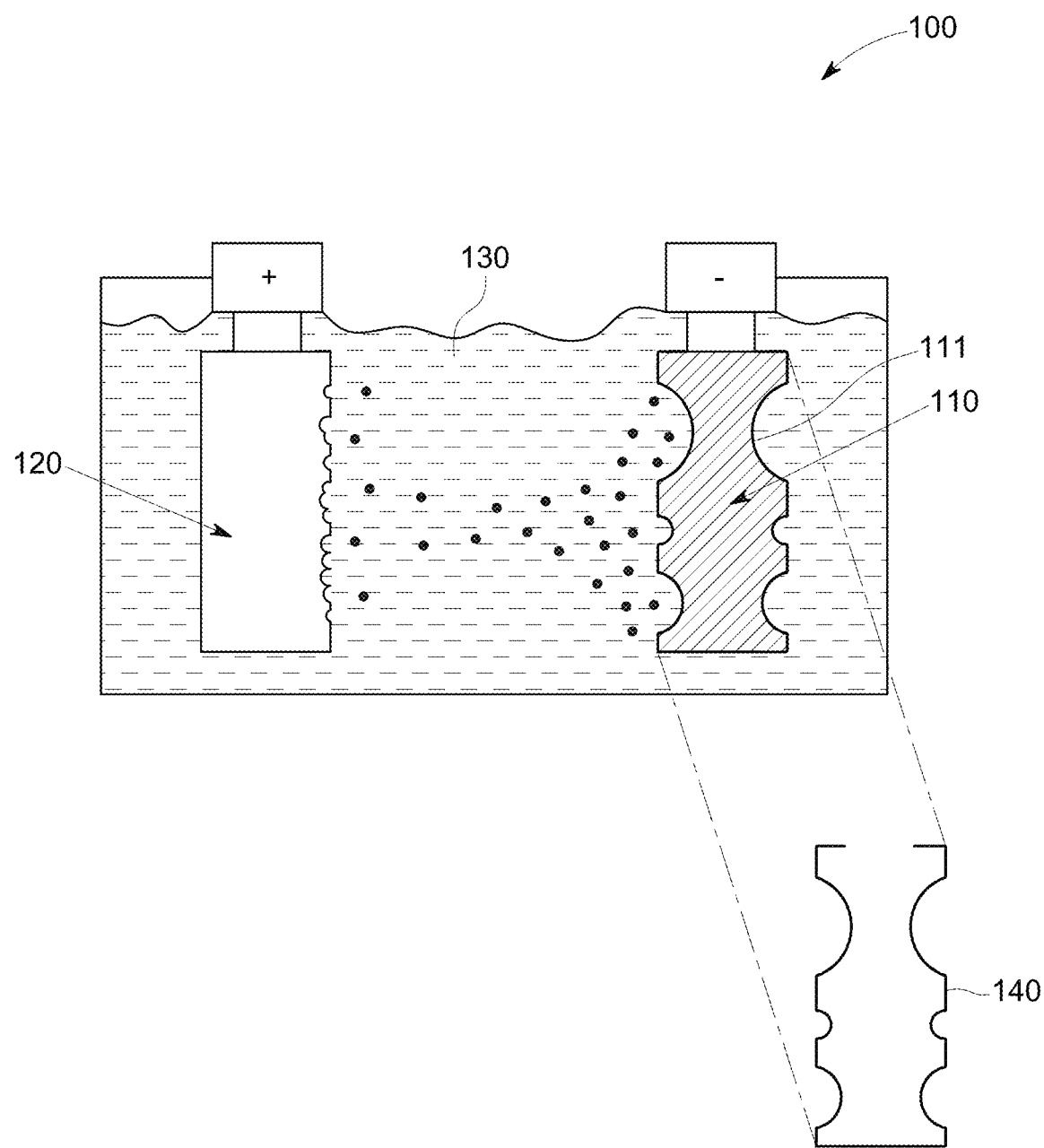
FIG. 1 is a schematic illustration of the electroforming process, in accordance with some embodiments of the disclosure.

In the following specification and the claims, which follow, reference will be made to a number of terms, which shall be defined to have the following meanings. The singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value solidified by a term or terms, such as "about", and "substantially" is not to be limited to the precise value specified. In some instances, the approximating language may correspond to the precision of an instrument for measuring the value. Similarly, "free" may be used in combination with a term, and may include an insubstantial number, or trace amounts, while still being considered free of the solidified term. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein.

In the embodiments described herein, memory may include, but is not limited to, a computer-readable medium, such as a random-access memory (RAM), and a computer-readable non-volatile medium, such as flash memory. Alternatively, a floppy disk, a compact disc—read only memory (CD-ROM), a magneto-optical disk (MOD), flash drive, and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein.

Moreover, as used herein, the term "non-transitory computer-readable media" includes all tangible, computer-readable media, including, without limitation, non-transitory computer storage devices, volatile and nonvolatile media, and removable and non-removable media such as a firmware, physical and virtual storage, a compact disc read only memory (CD-ROM), or a digital versatile disc (DVD). The non-transitory computer storage devices may also include digital source such as a network or the Internet, as well as yet to be developed digital means, with the sole exception being a transitory, propagating signal. Other non-limiting examples of the memory include a dynamic random-access memory (DRAM) device, a static random-access memory (SRAM) device, and a flash memory.

As mentioned earlier, electroforming is an additive manufacturing process where metallic components are grown on an appropriately shaped cathode (usually referred to in the art as "mandrel") through the electrochemical reduction of metal ions in a liquid solution. FIG. 1 is a schematic illustration of an electroforming process. As shown in FIG. 1, in the electroforming process, a cathode 110 and an anode 120 are immersed in an electrolyte 130 solution and component thickness builds on the cathode surface 111 over time as current is passed between the electrodes 110, 120 (as shown in FIG. 1). Once the desired component thickness is reached, the cathode may be removed by mechanical, chemical, or thermal treatment, yielding a free-standing metal component 140.

However, as noted earlier, electroforming of components having complex shapes may pose challenges with respect to achieving consistent and controllable wall thickness. Therefore, for complex geometries, a typical electroforming process may involve a combination of shields and/or auxiliary electrodes. The additional shields and/or auxiliary electrodes may be placed in the electroforming apparatus along with the anode and cathode, followed by application of a specified current waveform over a fixed time. Over time, the process parameters may be iterated over many configurations, sometimes using computer modeling software, to set up a new procedure for a specific component geometry. This modeled and optimized procedure may specify the desired process parameters, e.g., the size and shape of the anode(s), use and configuration of auxiliary electrodes and/or shields, or precise management of solution flow rates and direction. While this method can be engineered to produce the desired component geometry, it is often a time-consuming trial-and-error process that may not yield components with an optimal thickness distribution.

Figure 2A:
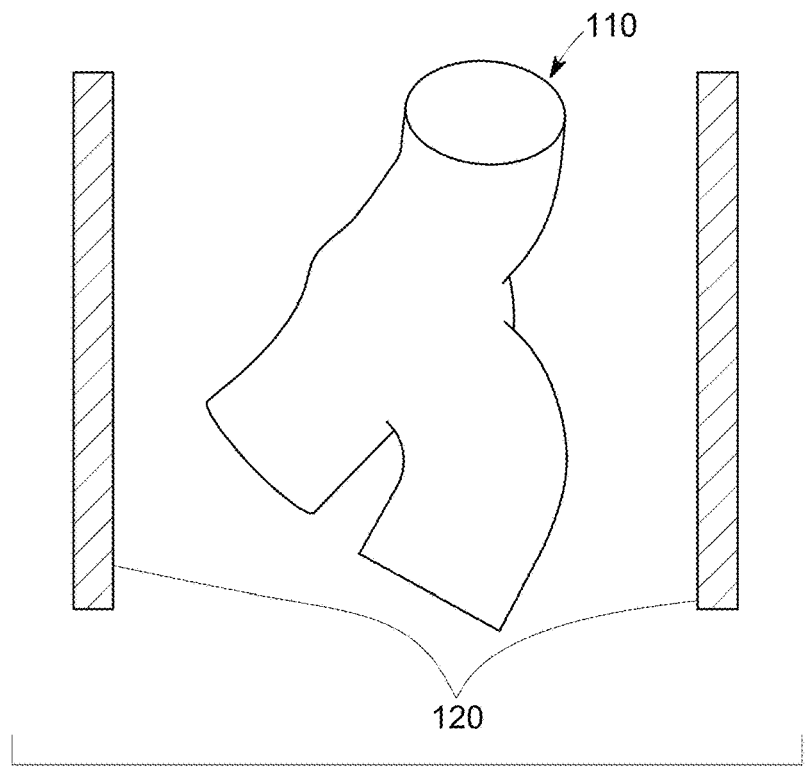
FIG. 2A shows a simulation of a baseline process for electroforming a tubular junction using a cathode and a plurality of anodes.
Figure 2B:
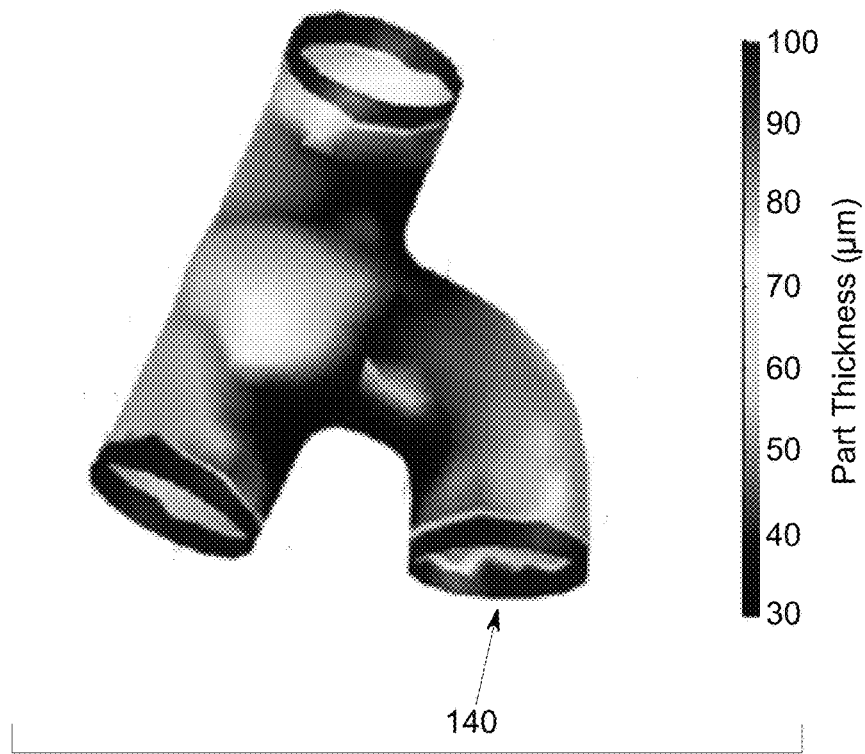
FIG. 2B shows the thickness distribution for the tubular junction formed using the simulation of FIG. 2A.

By way of example, FIG. 2A shows a simulation (using COMSOL Metaphysics® software) of a baseline process for electroforming a tubular junction. The process of FIG. 2A is simulated using a cathode 110 and a pair of simple flat sheet anodes 120. As shown in FIG. 2B, thickness of the component 140 formed using the simulated electroforming process is found to vary widely from about 30 mm in the fillets, to over 100 mm at the tube edges. This is, at least in part, due to the uneven current distribution and ionic concentration gradients that are set up during the electroforming process.

Figure 3A:
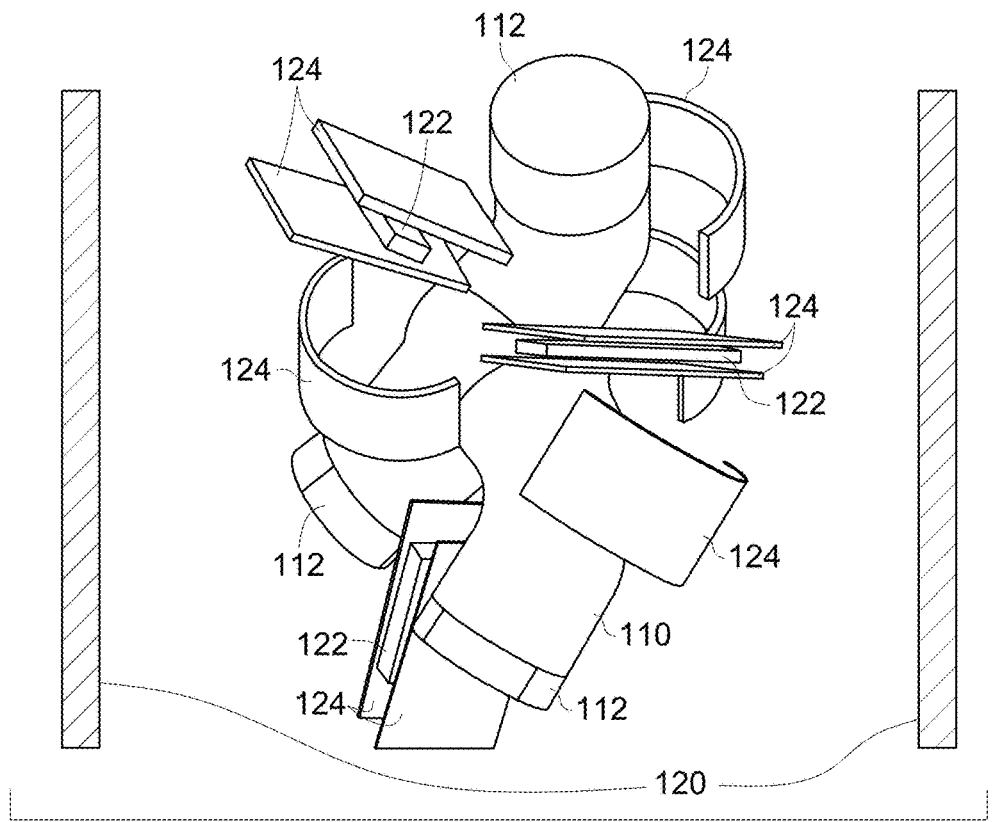
FIG. 3A shows a simulation of a baseline process for electroforming a tubular junction using a cathode, a plurality of anodes, a plurality of auxiliary anodes, a plurality of auxiliary cathodes, and a plurality of shields.
Figure 3B:
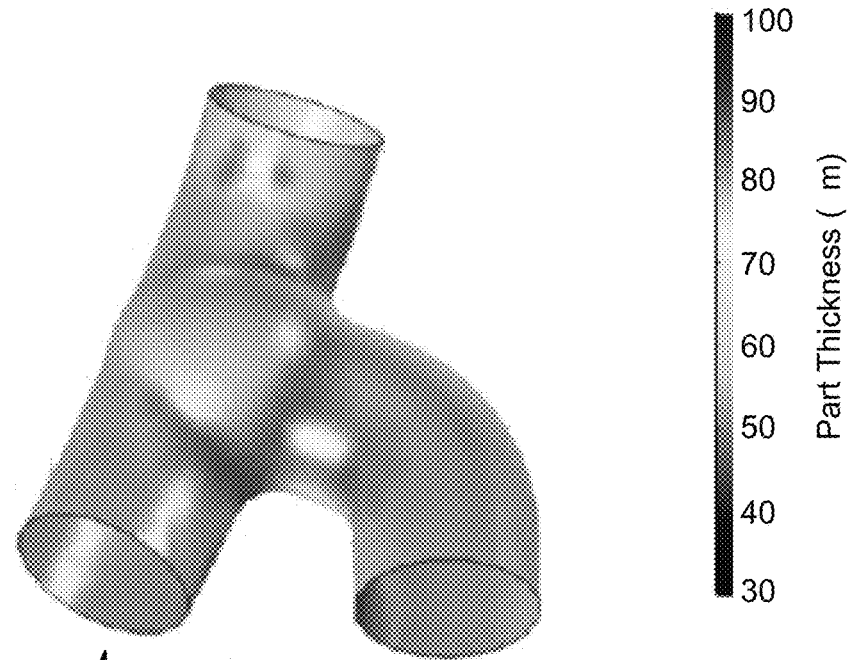
FIG. 3B shows the thickness distribution for the tubular junction formed using the simulation of FIG. 3A.

FIG. 3A shows a simulation result where a complex combination of auxiliary anodes and cathodes, and shields are used to produce a significantly more uniform component. FIG. 3A shows a simulation of an electroforming setup include a cathode 110, anodes 120, auxiliary cathodes 112, auxiliary anodes 122, and shields 124. However, as shown in FIG. 3B, thickness variation was still observed in the component 140, even after multiple iterations over the complex simulation setup used here.

Embodiments of the present disclosure address the problems related to electroforming of components with complex geometry by integrating artificial intelligence in the electroforming process. Embodiments of the present disclosure use trained machine learning algorithms to optimize the electroforming of arbitrary, complex shapes by adding several new degrees of freedom to the electroforming process such as cathode and anode motion, custom anode shape(s), varying current, and active control over shields or auxiliary electrodes. Integration of the trained machine learning algorithm with robotic manipulation enables reduction of the process development time, and also enables manufacturing of more complex components with minimal thickness variation, using electroforming.

In some embodiments, a method of forming a component by an electroforming process using an electroforming apparatus is presented. The electroforming apparatus includes an anode, a cathode and an electrolyte including a metal salt. The method includes receiving a set of training electroforming process parameters; training a machine learning algorithm based on at least a subset of the set of training electroforming process parameters; generating a set of updated operating electroforming parameters from the trained machine learning algorithm; and operating the electroforming apparatus based on the set of updated operating electroforming parameters. Further, operating the electroforming apparatus includes: applying an electric current between the anode and the cathode in the presence of the electrolyte, and depositing a plurality of metal layers on a cathode surface to form the component.

In some embodiments, a system for electroforming a component, is also presented. The system includes an electroforming apparatus and a controller operatively coupled to the electroforming apparatus. The electroforming apparatus includes an anode, a cathode and an electrolyte including a metal salt. The controller includes memory storing one or more processor-executable routines and a machine learning algorithm. The controller further includes one or more processors to execute the one or more processor-executable routines which, when executed, cause acts to be performed. The acts to be performed include: receiving a set of training electroforming process parameters; training a machine learning algorithm based on at least a subset of the set of training electroforming process parameters; generating a set of updated operating electroforming parameters from the trained machine learning algorithm; and operating the electroforming apparatus based on the set of updated operating electroforming parameters. Further, operating the electroforming apparatus includes: applying an electric current between the anode and the cathode in the presence of the electrolyte, and depositing a plurality of metal layers on a cathode surface to form the component.

Figure 4:
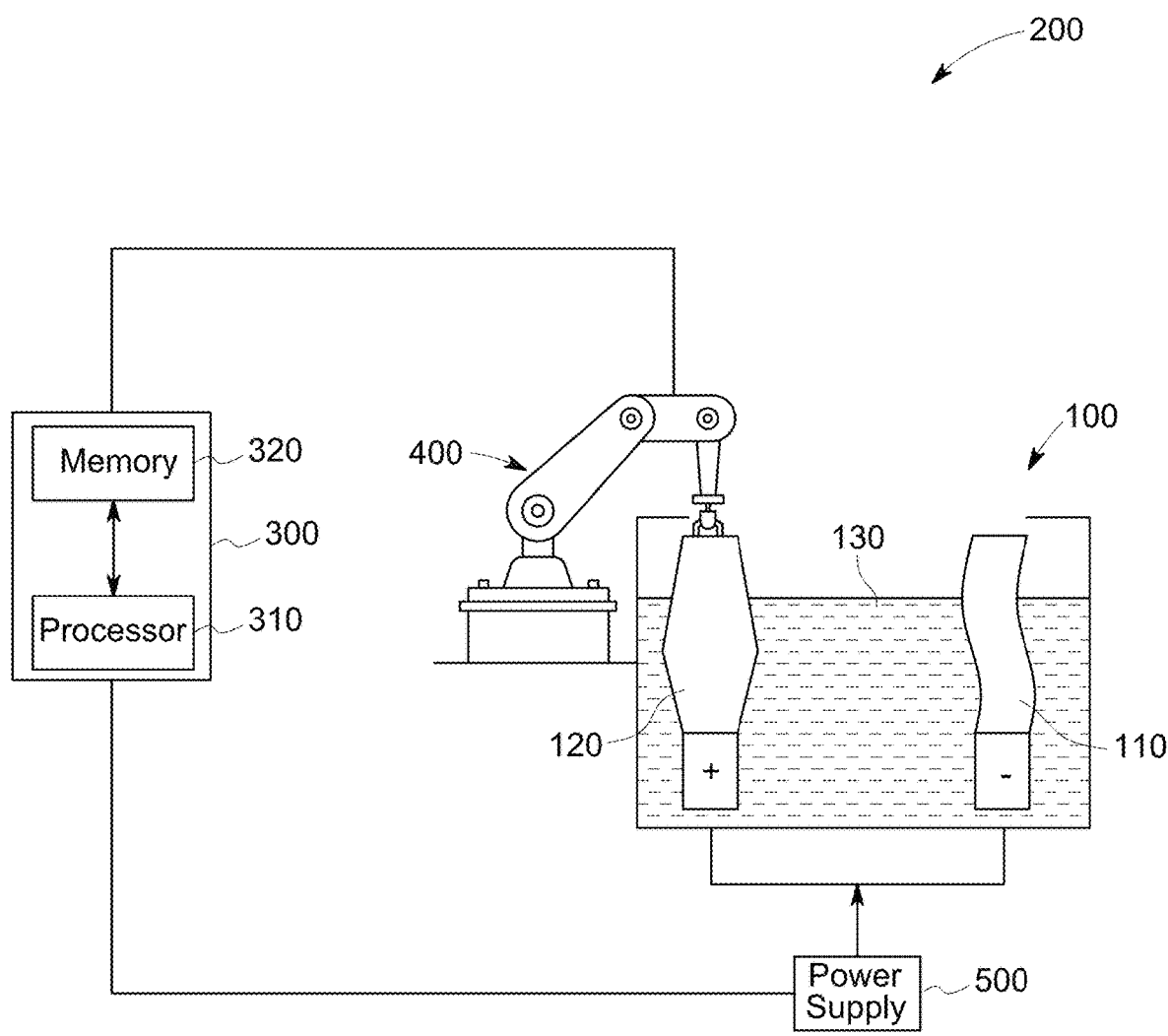
FIG. 4 is a schematic illustration of a system for electroforming a component, in accordance with some embodiments of the disclosure.
Figure 5:
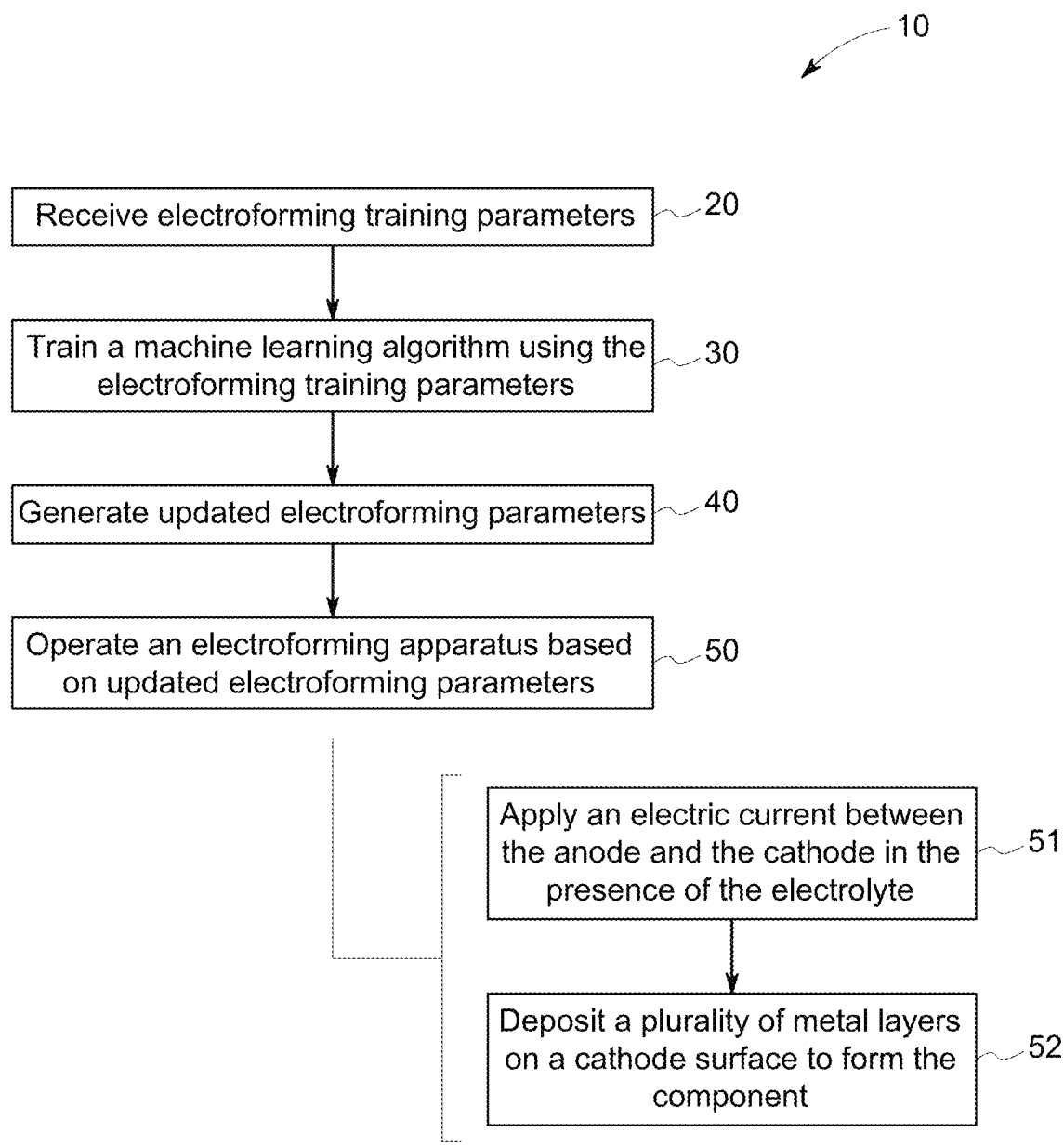
FIG. 5 is a flow chart illustrating an electroforming process, in accordance with some embodiments of the disclosure.

The methods and systems of electroforming, in accordance with some embodiments of the disclosure, are now described with reference to FIGS. 4 and 5. FIG. 4 is an illustration of a system 200 of electroforming a component and FIG. 5 depicts a flowchart illustrating a method 10 of forming an electroformed component, for example, using the system 200, in accordance with some embodiments of the disclosure.

Referring now to FIG. 4, the system 200 includes an electroforming apparatus 100, a controller 300, a robotic assembly 400 and a power supply 500. In the embodiment illustrated in FIG. 4, the electroforming apparatus 100 includes a cathode 110, an anode 120, an electrolyte 130 disposed between the cathode 110 and the anode 120. As mentioned previously, the metal ions from the metal salt in the electrolyte 130 are deposited on the cathode surface during the electroforming process to form the component. In FIG. 4, the shape, size and configuration of the cathode and the anode are shown for illustration purposes only. The shape and size of the cathode will depend on the geometry of the component to be manufactured using the electroforming process. Once the desired component thickness is reached, the cathode 110 may be removed by mechanical, chemical, or thermal treatment, yielding a free-standing metal component. In one example, the cathode 110 can be a low melting point material (i.e. a "fusible alloy") which can be cast into the cathode shape and subsequently melted out for re-use following electroforming. Other cathode 110 options include conductive waxes and metallized plastic which can be formed by injection molding, 3D printing, etc. In some cases, a reusable cathode 110 may also be possible where component geometry allows.

Further, in accordance with embodiments of the present disclosure, the shape, the size, and the configuration (defined by the coordinates and orientation states) of the anode 120 may be determined and controlled using the machine learning algorithm, as described in detail later. Further, in some embodiments, the electroforming apparatus may include a plurality of anodes 120. In such instances, the shape, the size, and the configuration of each of the anode of the plurality of anodes 120 may be determined and controlled using the machine learning algorithm.

In some embodiments, the electroforming apparatus may further include one or more auxiliary cathode 112, one or more auxiliary anode 122, or one or more shield 124, as illustrated in FIG. 3A. The additional anodes, usually referred to as "auxiliary anodes" in the art, are typically included in an electroforming process to add additional local current density over a particular surface area of the cathode. This is commonly needed over locations on the cathode surface that would otherwise be too thin without the auxiliary anode(s) in place. Similarly, auxiliary cathodes, sometimes referred to as "thieves" in the art, are used to actively draw excess current away from the main cathode (i.e. mandrel) so as to avoid excessive buildup of metal thickness on the final part. Auxiliary cathodes are often used near mandrel edges where part thickness can build excessively. Along with or instead of auxiliary anodes and cathodes, "shields" may also be used to block or channel current between the anode and cathode to achieve a specified deposition rate and component thickness. Shields are produced from non-conductive materials and are placed in an electroforming solution between the anode and cathode to shape the current density distribution as required over a given mandrel surface.

The cathode 110, the anode 120, and the auxiliary electrodes 112, 122 may be collectively referred to as "electrodes", herein throughout the specification. In FIG. 3A, the shape, size and configuration of the auxiliary cathodes 112, the auxiliary anodes 122, and shields 124 are shown for illustration purposes only. The shape, size and configuration of the auxiliary cathodes 112, the auxiliary anodes 122, and shields 124 will depend on the geometry of the component to be manufactured using the electroforming process. Further, in accordance with embodiments of the present disclosure, the shape, the size, and the configuration of the auxiliary cathodes 112, the auxiliary anodes 122, and shields 124 may be determined and controlled using the machine learning algorithm, as described in detail later. Furthermore, as shown in FIG. 3A, the electroforming apparatus may include a plurality of auxiliary cathodes 112, auxiliary anodes 122, and shields 124; the shape, the size, and the configuration of each of the auxiliary cathode 112, the auxiliary anode 122, and shields 124 may be determined and controlled using the machine learning algorithm.

Referring again to FIG. 4, the electroforming apparatus 100 further includes an electrolyte 130 disposed between the cathode 110 and the anode 120. In some embodiments, the electrolyte 130 may be further disposed between the cathode 110, the anode 120, the auxiliary cathodes 112, the auxiliary anodes 122, and shields 124. The electrolyte 130 includes a metal salt. In some embodiments, the electrolyte includes a solution of the metal salt. Non-limiting examples of suitable metal salts include chlorides, sulfates, and/or sulfamates of nickel, copper, cobalt, or combinations thereof. In certain embodiments, the metal salt includes a salt of nickel. The electrolyte may also include other chemical additives e.g., dispersants, surfactants and the like.

With continued reference to FIG. 4, in some embodiments, the electroforming system 200 may further include a robotic assembly 400. In the embodiment shown in FIG. 4, the robotic assembly 400 is depicted as mechanically coupled to the anode 120. In such embodiments, the robotic assembly 400 may be configured to move the anode 120 based on the configuration required for the electroforming process. In some such embodiments, the robotic assembly 400 may be configured to move the anode 120 based on a signal received from the controller 300. In some embodiments, the robotic assembly 400 may be instead or additionally configured to move one or more of the cathode 110, the auxiliary cathodes 112, the auxiliary anodes 122, and the shields 124. In some embodiments, the electroforming system 200 may include a plurality of such robotic assemblies 400.

As shown in FIG. 4, the electroforming system 200 further includes a power supply 500 communicatively linked to the controller 300. The power supply 500 applies a current between the cathode 110 and the anode 120, thereby depositing a plurality of metal layers on the cathode surface 111 to form the component, by directing metal ions from the metal salt onto the cathode surface 111. In some embodiments, the power supply 500 may be a programmable power supply 500 that is communicatively linked to the controller 300. The programmable power supply 500 may be configured to vary the current waveform that is applied between the cathode 110 and the anode 120, based on a signal received from the controller 300. In some embodiments, the programmable power supply 500 may be configured to vary the current waveform that is applied between the cathode 110, the anode 120, the auxiliary cathode 112, and the auxiliary anodes 122, shields, based on a signal received from the controller 300.

As noted earlier, the electroforming system further includes a controller 300, as shown in FIG. 4. The controller 300 includes one or more processors, such as, a processor 310. The processor 310 may include a specially programmed general-purpose computer, a microprocessor, a digital signal processor, and a microcontroller. Examples of the processor 310 include, but are not limited to, a reduced instruction set computing (RISC) architecture type processor or a complex instruction set computing (CISC) architecture type processor. Further, the processor 310 may be a single-core processor or a multi-core processor. The processor 310 may also include, or has electrically coupled thereto, one or more input/output ports.

The controller 300 further includes a memory 320 accessible by the processor 310. In some embodiments, the memory 320 may be integrated into the processor 310. In some other embodiments, the memory 320 may be external to the processor 310 and electrically coupled to the processor 310, as depicted in FIG. 4. The memory 320 may be a non-transitory computer-readable media. The non-transitory computer-readable media may include tangible, computer-readable media, including, without limitation, non-transitory computer storage devices.

The memory 320 stores processor-executable routines that are executable by the processor 310. The processor-executable routines, when executed by the processor 310, cause acts to be performed that contribute to methods described below as well as other variants that are anticipated, but not specifically listed. In a non-limiting example, processor-executable routines may be implemented in a variety of programming languages, including but not limited to C, C++, or Java. In some embodiments, by executing one or more of the processor-executable routines, the processor 310 may aid in manufacturing a component using an electroforming process.

The processor-executable routines, when executed by the processor 310 cause acts to be performed. The acts to be performed include steps illustrated in flowcharts of FIG. 5, in accordance with some embodiments of the disclosure. As illustrated in FIG. 5, a method 10 of forming a component using an electroforming process includes steps 20-50. The processor-executable routines, when executed by the processor 310, may cause the processor 310 to perform acts indicated by the steps 20-50 of the method 10.

Referring now to FIGS. 3-5, the method 10 includes receiving a set of training electroforming process parameters at step 20. In some embodiments, the set of training electroforming process parameters may be stored as a database in the memory 320 of the controller 300. In such instances, the step 20 of receiving may include retrieving the set of training electroforming parameters from the memory 320 via the one or more processor 310. In some other embodiments, the set of training electroforming process parameters may be provided as an input by a user to the one or more processor 310 of the controller 300, e.g., via a user input interface (not shown).

In some embodiments, the set of training electroforming parameters include an initial set of operating parameters of the electroforming apparatus 100 and an initial thickness variation across a surface of the component formed by the electroforming process. The initial operating parameters may include one or more of coordinates of the anode 120, orientation states of the anode 120, coordinates of the cathode 110, orientation states of the cathode 110, coordinates of the shield 124, orientation states of the shield 124, coordinates of an auxiliary electrode 112, 122, orientation states of an auxiliary electrode 112, 122, or a waveform characteristic of the applied electric current. The term "coordinates" as used herein refers to the location of the electrode, e.g., the anode in the xyz plane and can be represented by $x_t$, $y_t$, and $z_t$, wherein "t" is the time at which the coordinates are determined. The term "orientation states" as used herein refers to the angles that the electrode, e.g., the anode makes in the xyz plane and can be represented by $\theta_{xy}$, $\theta_{yz}$, and $\theta_{xz}$ at time "t". Similarly, the coordinates and the orientation states of the cathode 110, the auxiliary electrodes 112, 122 and shields 124 may be represented at a time "t". In some embodiments, the initial operating parameters of the electroforming apparatus 100 may be based on historical data. In some embodiments, the historical data may be based on actual operating parameters employed during an electroforming process. In some other embodiments, the historical data may be based on an estimate of the operating parameters by the operator based on previous experience.

The term "initial thickness variation" as used herein refers to the variation in thickness across a surface of the component to be formed before the application of the machine learning algorithm. In some embodiments, the initial thickness variation may be based on historical data. In some embodiments, the initial thickness variation may be calculated by applying the initial set of operating parameters of the electroforming apparatus 100 to a computational electrodeposition model. Non-limiting examples of suitable computational electrodeposition models include solutions of Tafel, Butler-Volmer, and/or Nernst-Plank equations using, for example, a finite element numerical approach.

Referring again to FIGS. 4 and 5, the method further includes, at step 30, training a machine learning algorithm based on at least a subset of the set of training electroforming process parameters. As noted earlier, the machine learning algorithm may be stored in the memory 320 of the controller 300. The machine learning algorithm may employ supervised learning, unsupervised learning, or reinforcement learning. In some embodiments, a suitable machine leaning algorithm in accordance with embodiments of the disclosure is based on reinforcement learning. Non-limiting example of a suitable reinforcement learning-based algorithms include Q-learning algorithm. In some embodiments, the machine learning algorithm is based on deep learning such as a deep neural network. In some embodiments, the machine learning algorithm is a deep reinforcement learning algorithm, e.g., a deep Q-learning algorithm.

In certain embodiments the machine learning algorithm is a Q-learning algorithm. Q-learning is a reinforcement learning technique used in machine learning. Q-learning is a model-free learning environment that can be used in situations where the agent initially knows only the possible states and actions but doesn't know the state-transition and reward probability functions. In Q-learning the agent improves its behavior (online) through learning from the history of interactions with the environment.

Q-learning involves an agent, a set of states ("S") and a set of actions ("A") per state. The goal of Q-learning is to learn a policy, which tells an agent what action to take under what circumstances. By performing an action "a" within the set of actions A (a ε A), the agent transitions from state to state. Executing an action in a specific state provides the agent with a reward (a numerical score). The goal of the agent is to learn to select actions to maximize its total (future) reward. In particular, in Q-learning, the reinforcement learner tries to infer an action-value function, i.e., a function which predicts the value (in terms of the reward that will be achieved) of each of the many actions an agent could take. Thus, if the approximation is good, the agent can choose the best action. It does this by updating the approximation of the Q-function after taking an action and observing the reward by adding the old estimate of the reward for the chosen state-action pair with the discounted predicted future reward.

In some embodiments of the disclosure, the reward as used in the Q-learning algorithm is defined as the root mean square error (RMSE) of a thickness variation across a surface of the component, formed by the electroforming process 10. In such instances, high RMSE would imply lower rewards. The term "thickness variation" as used herein refers to the difference (plus or minus) in the thickness between a pre-determined target thickness and the thickness obtained after the electrodeposition process (e.g., after the simulated electrodeposition process). In some embodiments, the target thickness may be substantially uniform across the component. In some other embodiments, the component may be defined by a pre-determined target thickness distribution, i.e., the component may include thicker and thinner portions. In some such instances, the component may have a substantially non-uniform target thickness and may be characterized by a target thickness profile. In such embodiments, the reward function (e.g., defined by RMSE) may be based on the deviation from the desired thickness profile. Embodiments of the disclosure, as discussed herein, allow for training of the machine learning algorithm such that a component with a target distributed thickness profile may be manufactured.

Further, as noted earlier, the goal is to maximize rewards and thus lower RMSE. In accordance with some embodiments of the disclosure, training the machine learning algorithm includes maintaining a root mean square error (RMSE) of a thickness variation across a surface of the component, formed by the electroforming process, in a range from about 1 micrometer to about 200 micrometers. In accordance with some embodiments of the disclosure, training the machine learning algorithm includes maintaining a root mean square error (RMSE) of a thickness variation in a range from about 1 micrometer to about 50 micrometers. In accordance with some embodiments of the disclosure, training the machine learning algorithm includes maintaining a root mean square error (RMSE) of a thickness variation in a range from about 1 micrometer to about 10 micrometers. Further, in some embodiments, depending on the end application of the electroformed component, the RMSE of a thickness variation may be less than 1 micrometer or greater than 200 micrometers. In some such embodiments, the RMSE of a thickness variation may be in a range from about 1 nm to about 1 micrometer. Further, in some such embodiments, the RMSE of a thickness variation may be in a range from about 200 micrometers to about 10000 micrometers.

Figure 6:
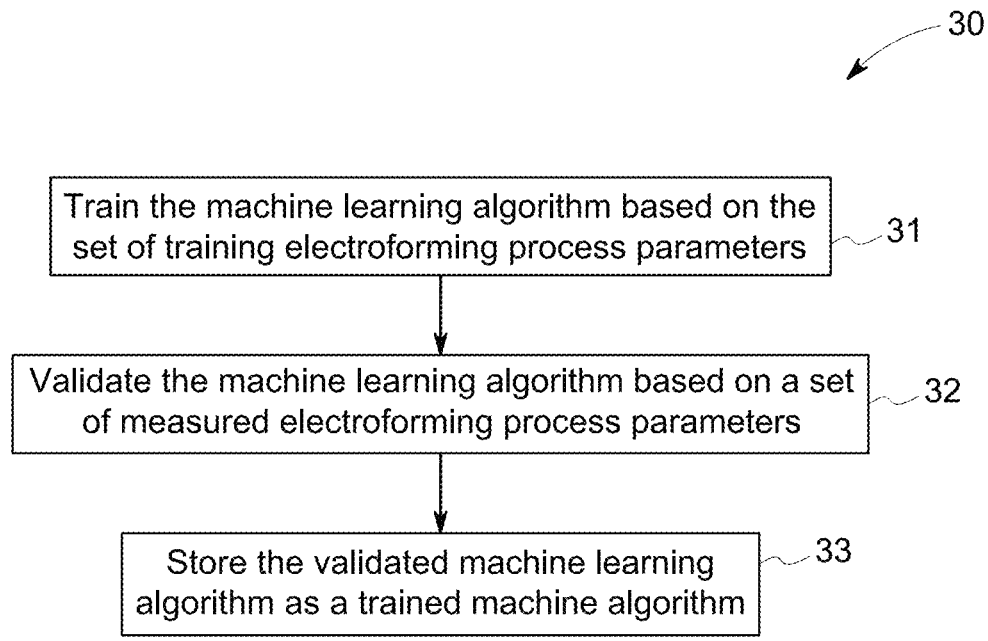
FIG. 6 is a flow chart illustrating a step of training the machine learning algorithm during the electroforming process, in accordance with some embodiments of the disclosure.

In some embodiments, the trained machine learning algorithm may be further validated and stored in the memory 320 of the controller 300. Referring now to FIG. 6, in some embodiments, the step 30 of training the machine learning algorithm includes, at sub-step 31, training the machine learning algorithm based on the set of training electroforming process parameters. As noted earlier, in some embodiments, a computer simulation may be used to train the machine learning algorithm. In such instances, the entire set of training electroforming parameters may used to train the machine learning algorithm. The step 30 further includes, at sub-step 32, validating the machine learning algorithm based on a set of measured electroforming process parameters. The set of measured electroforming parameters may be obtained in real-time via appropriate sensors, or, alternately may be based on historical data that may be, e.g., stored in the memory of the controller 300. The step 30 furthermore includes, at sub-step 33, storing the validated machine learning algorithm as a trained machine algorithm.

Figure 7:
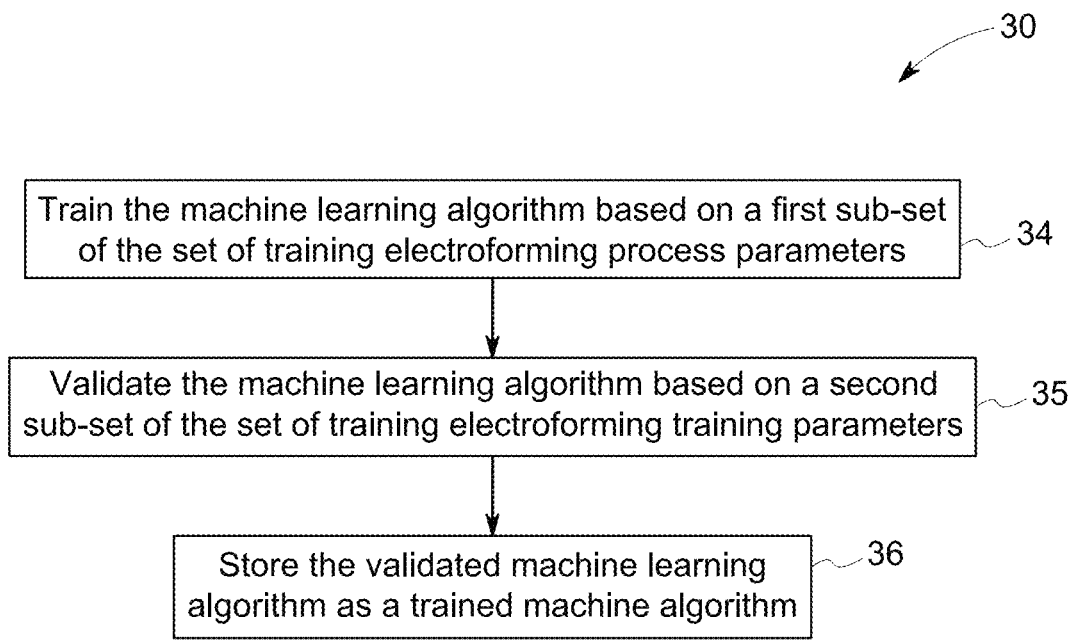
FIG. 7 is a flow chart illustrating a step of training the machine learning algorithm during the electroforming process, in accordance with some embodiments of the disclosure.

In some other embodiments, as shown in FIG. 7, the step 30 of training the machine learning algorithm includes, at sub-step 34, training the machine learning algorithm based on a first subset of the set of training electroforming process parameters. As noted earlier, in some embodiments, a computer simulation may be used to train the machine learning algorithm. The step 30 further includes, at sub-step 35, validating the machine learning algorithm based on a second sub-set of the set of training electroforming process parameters. The step 30 furthermore includes, at sub-step 36, storing the validated machine learning algorithm as a trained machine algorithm.

Referring back to FIGS. 3-5, the method 10 further includes, at step 40, generating a set of updated operating electroforming parameters from the trained machine learning algorithm. As described herein earlier, the trained machine learning algorithm may be validated and stored in the memory 320 of the controller 300. In some embodiments, the set of updated operating parameters includes one or more of updated coordinates of the cathode 110, updated orientation states of the cathode 110, updated coordinates of the anode 120, updated orientation states of the anode 120, updated coordinates of the shield 124, updated orientation states of the shields 124, updated coordinates of the auxiliary electrodes 112, 122, updated orientation states of the auxiliary electrode 112, 122, or an updated waveform characteristic of the applied electric current.

The method further includes, at step 50, operating the electroforming apparatus 100 based on the set of updated operating electroforming parameters. In some embodiments, operating the electroforming apparatus 100 includes moving, using a robotic assembly 400, one or more of the cathode 110, the anode 120, the auxiliary electrodes 112, 122, or the shields 124, based on one or more of the updated coordinates of the cathode 110, updated orientation states of the cathode 110, updated coordinates of the anode 120, updated orientation states of the anode 120, updated coordinates of the shields 124, updated orientation states of the shields 124, updated coordinates of the auxiliary electrodes 112, 122, or updated orientation states of the auxiliary electrodes 112, 122. As mentioned earlier, FIG. 4 shows a single robotic assembly 400 mechanically coupled to the anode 120 and an end-effector of the robotic assembly is configured to move the anode 120. However, the robotic assembly may be further coupled to one or more of the cathode 110, the auxiliary electrodes 112, 122, or the shields 124. Further, the method 10 may include moving the anode 120, the cathode 110, the auxiliary electrodes 112, 122, or the shields 124, using a plurality of robotic assemblies 400.

In some embodiments, after step 40, the controller 300 may send a signal to the robotic assembly 400 to move one or more of the anode 120, the cathode 110, the auxiliary electrodes 112, 122, or the shields 124. The signal from the controller 300 to the robotic assembly 400 may further include details of the type (e.g., upward, downward, sideward, angular) and degree of movement (e.g., displacement distance, angle of rotation) desired based on the updated coordinates and/or the orientation states. In some other embodiments, if after the step 40, there is no change in the updated coordinates and/or the orientations states of the electrodes in the electroforming apparatus 100, the controller 300 may either send a signal indicating no change, or, alternatively, no signal may be sent from the controller 300 to the robotic assembly 400.

In some embodiments, operating the electroforming apparatus 100 includes varying the applied electric current, using the programmable power supply 500, based on the updated waveform characteristic of the applied electric current. In some embodiments, after step 40, the controller 300 may send a signal to the programmable power supply 500 to vary the current waveform. The signal from the controller 300 to the programmable power supply 500 may further include details of the current waveform desired based on the updated waveform. In some other embodiments, if after the step 40, there is no change in the updated current waveform, the controller 300 may either send a signal indicating no change, or, alternatively, no signal may be sent from the controller 300 to the programmable power supply 500.

In some embodiments, after step 40, the controller may send a signal to both the robotic assembly 400 and the programmable power supply 500, based on the updated coordinates of the electrodes or the shields, the updated orientations states of the electrodes or the shields, and the updated waveform characteristic of the applied electric current. In such instances, the method may include moving one or more the electrodes or the shields, as well as changing the waveform characteristic of the applied electric current. In accordance with some embodiments of the disclosure, the movement of the electrodes or the shields and/or the application of updated current waveform may be executed in real-time.

Referring again to FIGS. 3-5, the step 50 of method 10 further includes, at sub-step 51, applying an electric current between the anode 120 and the cathode 110 in the presence of the electrolyte. In some embodiments the electric current applied between the anode and the cathode may be based on the updated waveform characteristic as determined by the trained machine learning algorithm. Further, in some embodiments, one or both of the anode 120 and the cathode 110 may be moved to the updated coordinates and/or orientations states before the application of the electric current. In embodiments including shields 124 and/or auxiliary electrodes 112,122, one or more these may also be moved before the application of the electric current. In some embodiments, the method 10 may include applying the electric current between the anode 120 and the cathode 110, after each movement of the anode 120, the cathode 110, the shields 124 and/or the auxiliary electrodes 112, 122. The step 50 further includes, at sub-step 52, depositing a plurality of metal layers on a cathode surface 111 to form the component. Without being bound by any theory, it is believed that the method and systems employing trained machine learning algorithms, in accordance with embodiments of the disclosure, enable manufacture of components with complex geometries such that the components have a minimal RMSE of thickness variation across the surface of the components. As noted earlier, the component being manufactured using the embodiments described herein may have a target thickness profile that may be characterized by a substantially uniform thickness across the component or a distributed thickness profile across the component.

Figure 8:
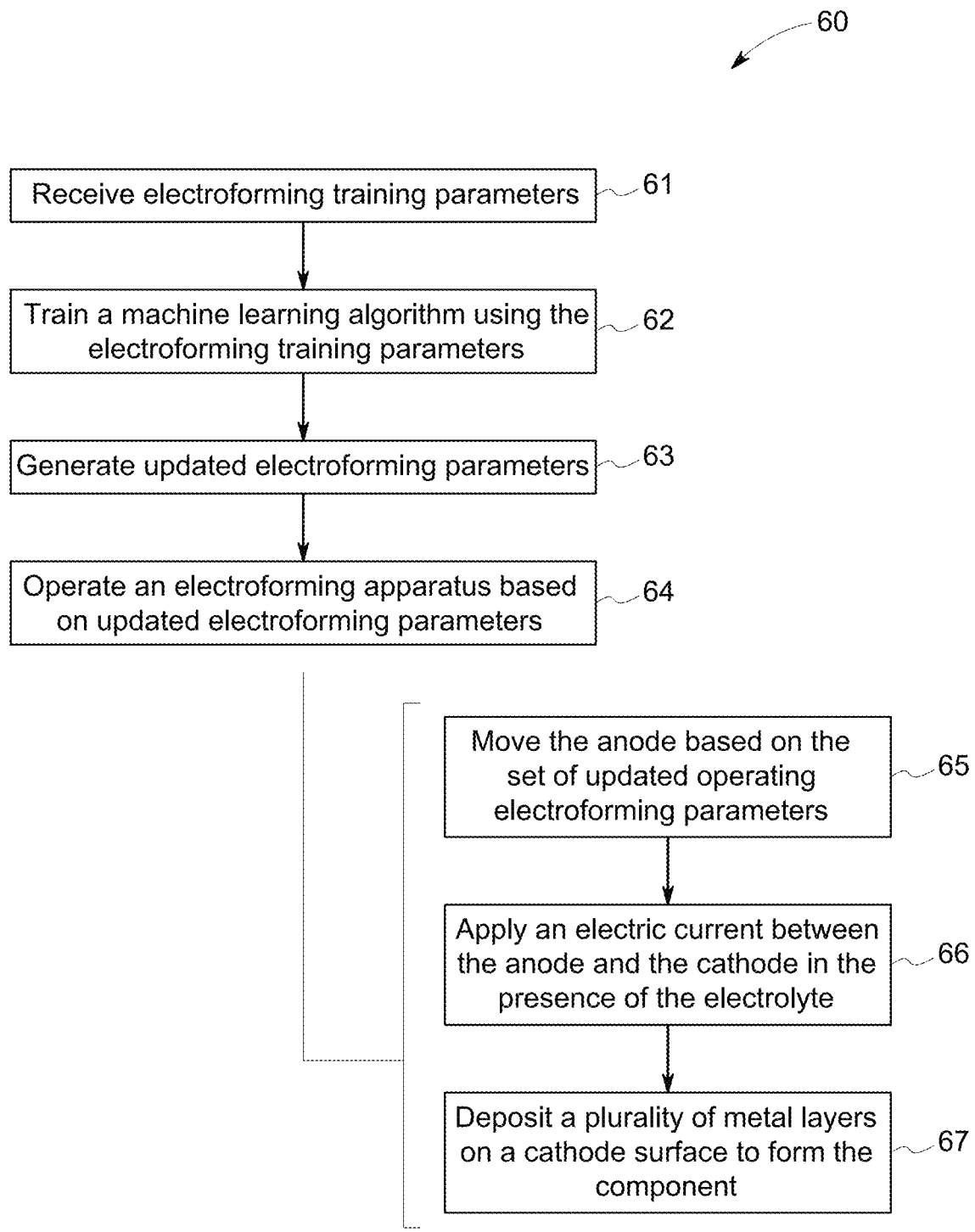
FIG. 8 is a flow chart illustrating an electroforming process, in accordance with some embodiments of the disclosure.

Referring now to FIGS. 4 and 8, a method 60 of forming a component by an electroforming process, in accordance with one embodiment of the disclosure, is presented. The method 60 includes, at step 61, receiving a set of training electroforming process parameters including coordinates of the anode 120, orientation states of the anode 120, or a combination thereof. The method 60 further includes, at step

62, training a machine learning algorithm based on at least a subset of the set of training electroforming process parameters. The method 60 further includes, at step 63, generating a set of updated operating electroforming parameters from the trained machine learning algorithm, wherein the set of updated operating parameters includes updated coordinates of the anode 120, updated orientation states of the anode 120, or a combination thereof. The method 60 furthermore includes, at step 64, operating an electroforming apparatus 100, based on the set of updated operating electroforming parameters. The step 64 of operating the electroforming apparatus includes, at sub-step 65, moving, using a robotic assembly 400, the anode 120, based on the set of updated operating electroforming parameters. The step 64, further includes, at sub-step 66, applying an electric current between the anode 120 and the cathode 110 in the presence of the electrolyte 130, after each movement of the anode 120. The step 64, further includes, at sub-step 67, depositing a plurality of metal layers on a cathode surface 111 to form the component, by directing metal ions from the metal salt on the cathode surface 111. In one example, a custom shaped anode 120 could be connected as the end effector of the robotic assembly 400. During the electroforming process, the anode 120 may be moved, based on the updated coordinates and/or orientation states from the trained machine learning algorithm, to maintain near-constant component thickness over the entire cathode surface 111.

Figure 9:
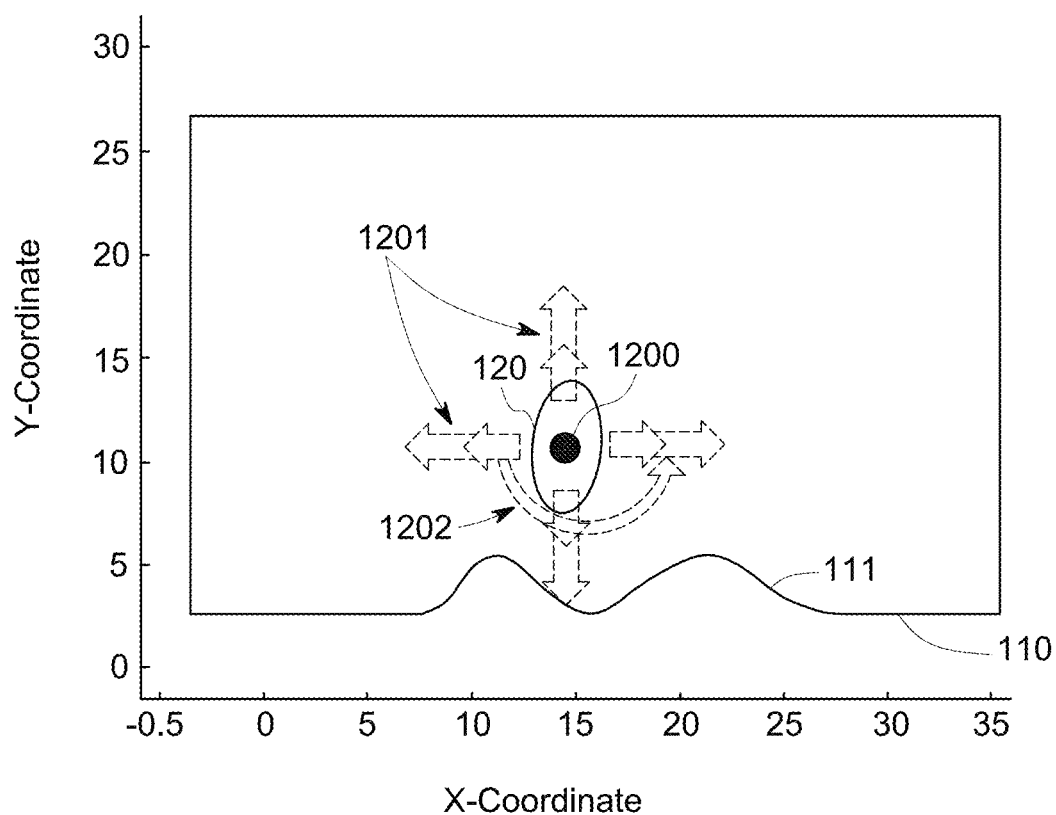
FIG. 9 shows a 2-D simulation of an electroforming process using a contoured cathode and an oblong anode, in accordance with some embodiments of the disclosure.

Referring now to FIG. 9, a 2-D simulation of an electroforming process using a cathode 110 and an anode 120, in accordance with embodiments of the disclosure, is represented. The cathode 110 has a curved contour, with a surface defined by 111, in the simulation as a representation of a complex geometry of the electroformed component. Further, in FIG. 9, the anode 120 is represented as having an oblong shape. At time "t" during the electroforming process, the anode 120 is characterized by a set of states "$S_t$" (1200 in FIG. 9). This set of states $S_t$ include the coordinates of the anode at time "t": $X_t$, $Y_t$ and $Z_t$ as well as orientation states at time "t": $\theta_{xy}$, $\theta_{yz}$, and $\theta_{xz}$. The set of states at time "t" is provided as an input to a machine learning algorithm, e.g., a Q-learning algorithm whose goal is to find an optimal policy that maximizes rewards. As noted earlier, in some embodiments, the reward function is defined as RMSE, and low RMSE represents high rewards.

In some embodiments, a Bellman equation may be used to optimize the Q-function as shown by equation I:

$$Q^*(s_t,a_t) = E_{s_{t+1}}[r_t + \gamma \max_{a_{t+1}} Q^*(s_{t+1}, a_{t+1})] \quad (I)$$

wherein, $Q^*$ is optimized Q function, $Es_{t+1}$ is the learning rate, g is the discount factor and is in a range from 0 to 1, $r_t$ is the reward at time "t", $s_t$ is the set of states at time "t", $a_t$ is the set of actions at time "t", $s_{t+1}$ is the set of states at time "t+1", and $a_{t+1}$ is the set of actions at time "t+1". Learning rate is used to estimate the confidence level (in the range from 0 to 1) of new value at each trial. A learning estimate of 1 means that all new values from the reward network are used for the iteration.

Based on the Bellman equation, the agent learns the optimal position and orientation to deposit uniform thickness. Further, by maximizing the Q function, updated coordinates and orientation states are derived, which translate into updated displacement and orientation actions.

In order to learn from the past experience, epsilon ($\epsilon$)-greedy approach is used to choose updated states and actions. In the $\epsilon$-greedy approach at each step, with small probability $\epsilon$, the agent picks a random action (i.e., explores) or with probability (1-$\epsilon$) the agent selects an action according to the current estimate of Q-values. In some embodiments, the $\epsilon$ value is 0.5. Initially, the agent randomly picks up states and actions. Following more iterations, the agent starts to choose the maximal value from the Q matrix (learning from good experiences). $\epsilon$ value can be decreased overtime as the agent becomes more confident with its estimate of Q-values.

In some embodiments, the reward function is calculated based on equations (II)-(IV)

$$\text{Reward} = 1/RMSD \quad (I)$$

$$RMSD = \sqrt{\frac{\sum_{p=1}^{N} (\hat{y}_p - y_p)^2}{N}} \quad (II)$$

$$y_p(i) = w * y_{p(i)} \quad (III)$$

If $y_p(i) > std + \overline{y_p}$ or

If $y_p(i) < \overline{y_p} - std$ wherein RMSD=root mean square deviation or root mean square error, $y_p$=thickness at positions "p", along the mandrel (cathode) surface, w=weight value, S=total number of positions measured along the mandrel surface, std=standard deviation of the thickness. N is the total grid points/samples.

Figure 10A:
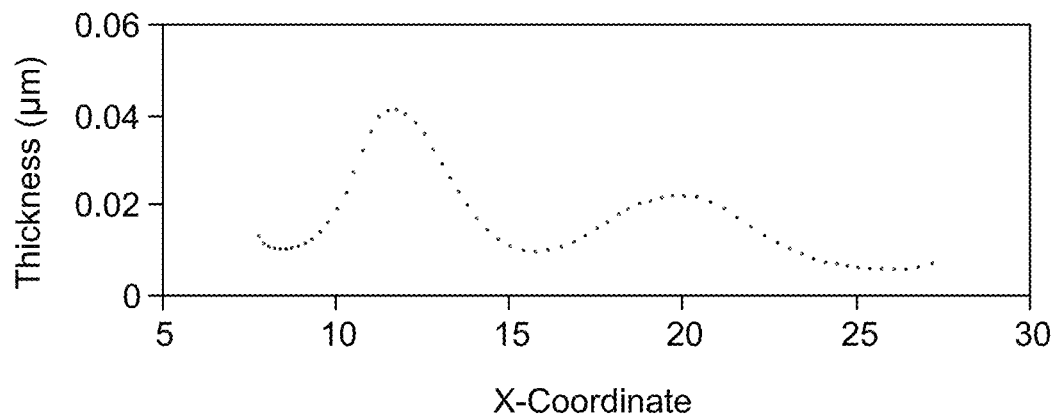
FIG. 10A shows the thickness of the layer deposited at time t=1 for different points along the cathode surface, using the 2-D simulation of FIG. 9, in accordance with some embodiments of the disclosure.
Figure 10B:
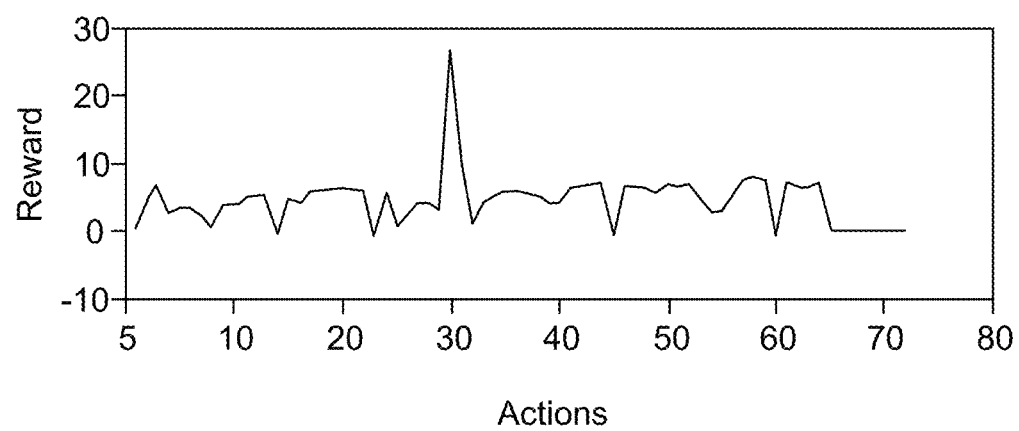
FIG. 10B shows the reward values at time t=1 for different points along the cathode surface, using the 2-D simulation of FIG. 9, in accordance with some embodiments of the disclosure.

Referring now to FIGS. 10A and 10B, the thickness of the layer deposited and reward values for different points along the mandrel (cathode) surface, using the simulation of FIG. 9, at time t=1 are shown. As shown in FIG. 10B, action "30" corresponds to the maximum reward function at time t=1. After the completion of the protocol at time "t=1", the initial condition at t+1 is replaced with the deposited surface from the previous time step. In some embodiments, each surface condition is unique and the agent cannot learn from the previous time step. The initial states (S) and actions (A) at each time step are set to be randomly chosen as initial guess for Q learning and the protocols are repeated until the end of the duration.

After policy validation, an updated policy from the machine learning algorithm is generated which includes a set of Actions $A_{t'}$, at time t'. The Actions $A_{t'}$, are based on the updated coordinates and orientation states $X_{t'}$, $Y_{t'}$, $Z_{t'}$, $\theta_{xy'}$, $\theta_{yz'}$, and $\theta_{xz'}$. In FIG. 9, the set of Actions are represented by the arrows 1201 and curved arrow 1202. As shown in FIG. 9, based on the set of Actions generated from the machine learning algorithm, the new set of actions 1201 may represent upward motion, downward motion, motion towards the left, or motion towards the right. Further, the action 1202 may represent rotation of the anode 120 based on the updated orientation states of the anode 120. Thus, by employing the trained Q-learning-based algorithm, at least six degrees of freedom for the anode 120 (X, Y, Z, $\theta_{xy}$, $\theta_{yz}$, and $\theta_{xz}$) can be varied to maximize the rewards and minimize RMSE. This may be further complemented with addition degrees of freedom for the cathode 110, the auxiliary electrodes 112, 122, and the shields 124, as described earlier.

Thus, embodiments of the disclosure use artificial intelligence methods coupled with process modeling and robotics to produce complex electroformed shapes in a more efficient way. Computational electrodeposition models are used to teach an appropriate machine learning algorithm where additional degrees-of-freedom are allowed in the electroforming process. The additional degrees of freedom can include real-time multi-axis motion of the cathode and/or anode, custom shaped anodes, moveable shields and/or auxiliary electrodes, and/or the option of varying the applied current waveform over time. After model training, and once an acceptable process is simulated, the prescribed motion(s) may be applied during the electroforming process using robotic controls and/or the current waveform may be applied using a programmable power supply. It is expected that this approach will result in better quality components with shorter development time.

This is in contrast to conventional electroforming processes that are for the most part, static. That is, once a configuration is set, the anode, cathode, and any auxiliary features are placed in a tank and power is applied to build the component(s). There is no active feedback or ability to correct uneven deposition during the duration of the process. In accordance with embodiments of the disclosure, electrodeposition models and artificial intelligence methods are used to optimize the additional degrees-of-freedom to produce high quality components (e.g., with minimal thickness variation) having complex geometry. Further, the integration of machine learning with robotic manipulation may also reduce the process development time.

As noted earlier, the methods and systems in accordance with embodiments of the disclosure may advantageously allow for fabrication of electroformed components having a complex geometry with a substantially uniform thickness. In some embodiments, the electroforming methods and systems, as described herein, may be suitable for manufacturing components with dimensions greater than 100 microns. In some other embodiments, the electroforming methods and systems, as described herein, may suitable for manufacturing of components with dimensions on the orders of a few microns, or even in the range of nanometers. In some embodiments, the electroformed component is a component of an aircraft engine, a gas turbine, or a marine engine. In certain embodiments, the electroformed component includes aircraft engine conveyance components, tubings, ducting, seals, vanes, airfoils, struts, liners, cases, flow-path structures, leading edges, brackets, flanges, or housings. In some embodiments, the electroformed component may be a component of an industry where small-scale parts are desired with micro-precision, e.g., optical components, surgical instruments, medical instruments, scientific instrumentation, microelectronics, microfluidic devices, microelectronic mechanical systems (MEMS), sensors, actuators, nanostructures, and the like.

EXAMPLES

The examples that follow are merely illustrative and should not be construed to be any sort of limitation on the scope of the claimed invention.

Figure 11:
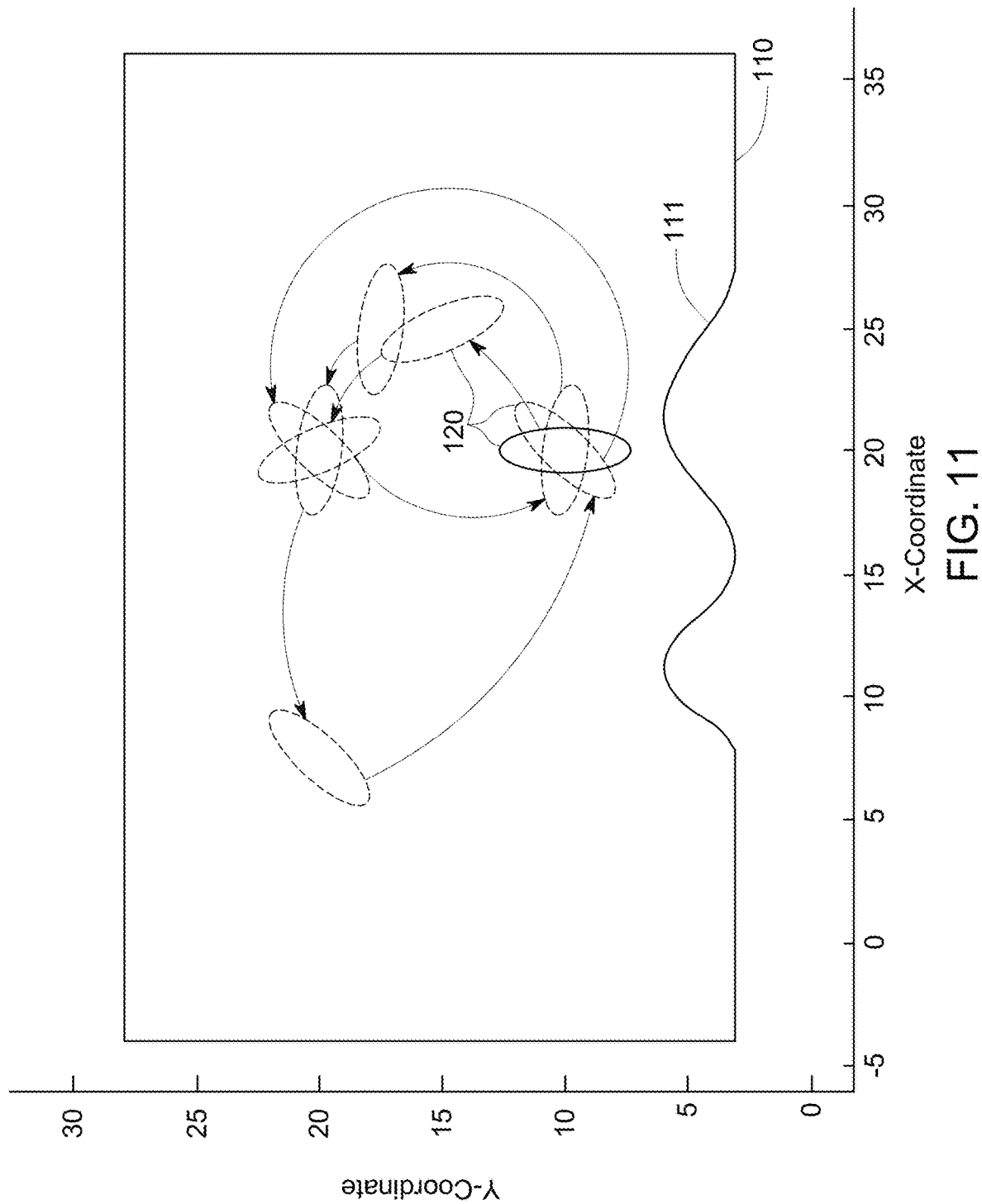
FIG. 11 shows the coordinates and orientation states of the oblong anode used in a 2-D simulation, for every one second step-change, in accordance with some embodiments of the disclosure.
Figure 12A:
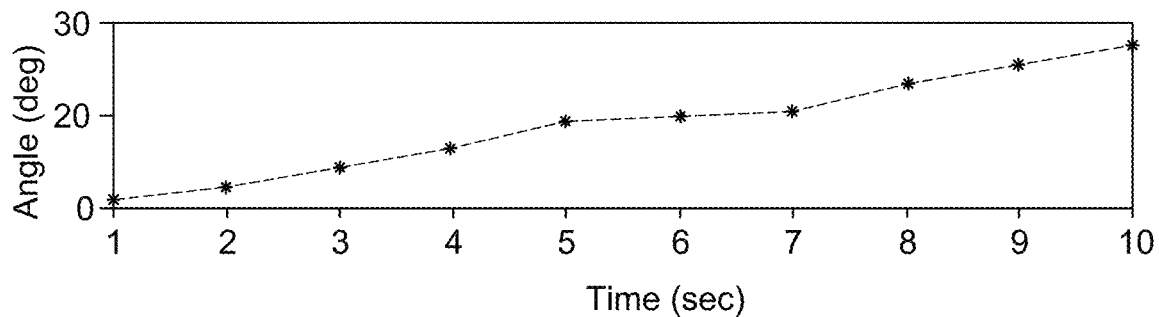
FIG. 12A shows the anode kinematic pattern (degrees) for the simulation of FIG. 11.
Figure 12B:
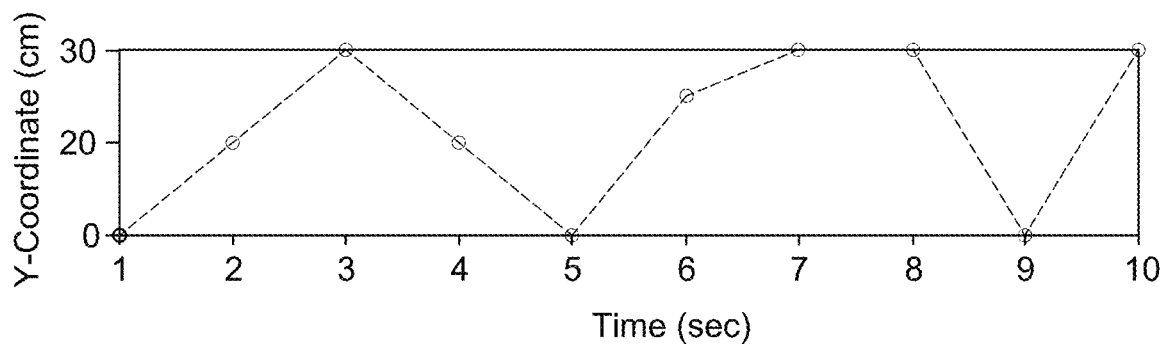
FIG. 12B shows the anode kinematic pattern (Y-coordinates) for the simulation of FIG. 11.
Figure 12C:
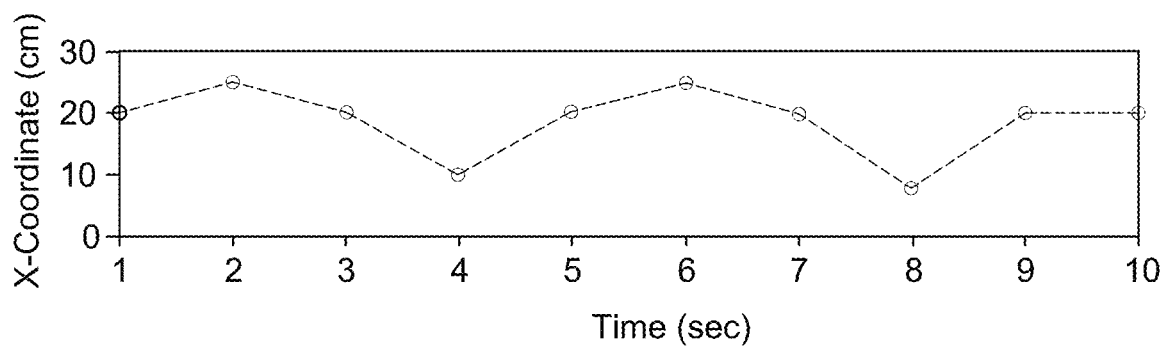
FIG. 12C shows the anode kinematic pattern (X-coordinates) for the simulation of FIG. 11.
Figure 13:
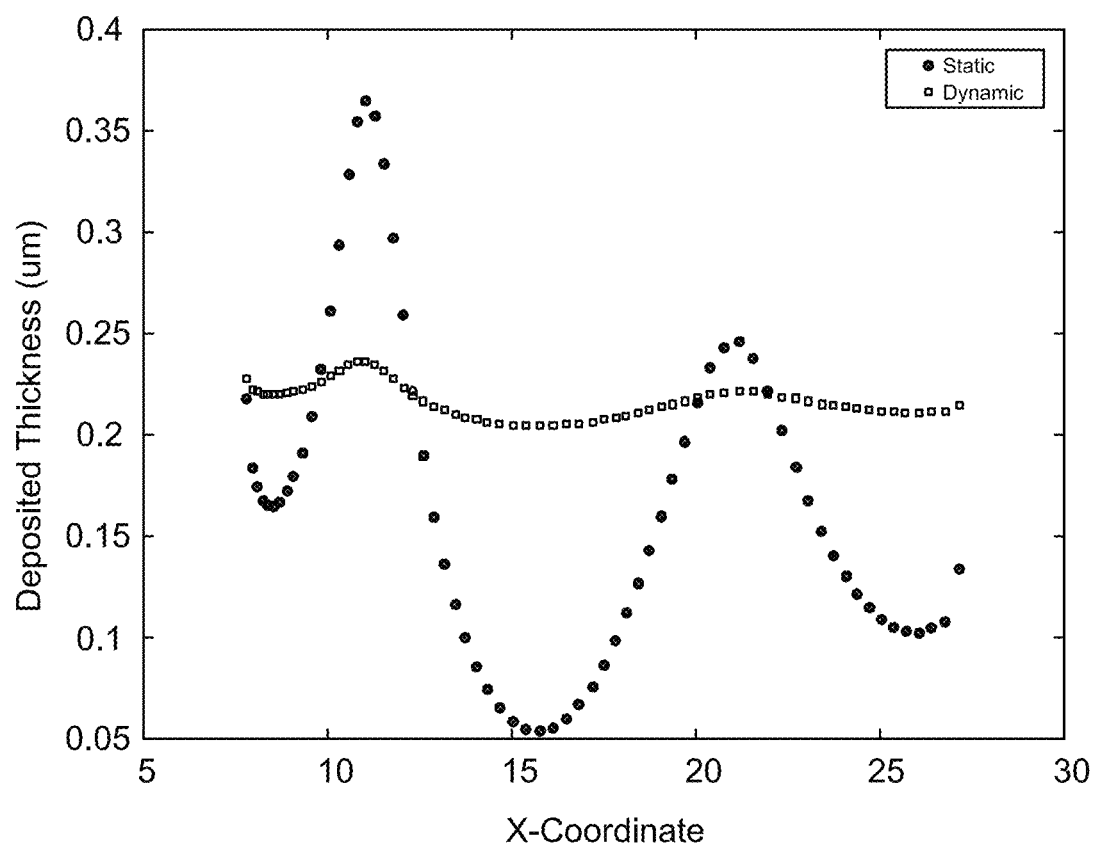
FIG. 13 shows the variation in thickness across different positions along the cathode surface for a dynamic electrode-position process versus a static electroforming process, in accordance with some embodiments of the disclosure.

A 2-D simulation of an electroforming process using an oblong-shaped anode 120 and a cathode 110 with a curvature (defined by surface 111) is shown in FIG. 11. The simulation was setup with 1000 iterations with five episodes of Q learning process at each time step. The initial epsilon rate was set to 0.5 and the decay factor per iteration was set to 0.98. The learning rate for this case was setup to be 0.99. The discount rate was set to 0.9 for determining the importance of future state. The Q table determined by resolution of states and actions was a matrix of 77 by 72. An electroforming deposition process for a time duration of 10 seconds, by changing the coordinates and orientation states, of the anode was simulated. FIG. 11 shows the coordinates and orientation states of the oblong anode 120 (represented by solid line), used in the simulation, after each stage of movement. The arrows indicate the direction of movement of the anode. FIGS. 12A-12C further show the anode kinematic pattern for the 10 seconds simulation. As described in detail earlier, the coordinate and orientation states as obtained from FIGS. 12A-12C can be used for manipulating the trajectory of the robotic assembly FIG. 13 shows the variation in thickness across different positions along the mandrel (cathode) surface for a dynamic electroforming process versus a static electroforming process. The simulation for the dynamic process (e.g., a process that involves movement of the anode 120) was conducted for 10 seconds, as described earlier, with respect to FIGS. 11 and 12A-12C. The simulation for the static process was also conducted for 10 seconds, however, in the static process the anode was kept in a stationary position throughout the simulation. As shown in FIG. 13, the dynamic electroforming process showed significantly lower variation in thickness across the surface as compared to a static electroforming process. In the simulation set-up described herein, at least five times reduction in surface thickness variation was obtained by using the dynamic electroforming process, in accordance with the embodiments described herein.

The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present disclosure. As used in the claims, the word "comprises", and its grammatical variants logically also subtend and include phrases of varying and differing extent such as for example, but not limited thereto, "consisting essentially of" and "consisting of" Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. A method of forming a component by an electroforming process using an electroforming apparatus comprising an anode, a cathode and an electrolyte comprising a metal salt, the method comprising:

receiving a set of training electroforming process parameters, the set of training electroforming process parameters including one or more of first coordinates of a shield, a first orientation state of the shield, second coordinates of an auxiliary electrode, a second orientation state of the auxiliary electrode, or a waveform characteristic of an applied electric current;

training, based on at least one simulated electroforming process, a machine learning algorithm based on at least a subset of the set of training electroforming process parameters and wherein training the machine learning algorithm comprises training the machine learning algorithm based on the set of training electroforming process parameters corresponding to the at least one simulated electroforming process, validating the machine learning algorithm based on a set of measured electroforming process parameters corresponding to at least one actual electroforming process, and storing the validated machine learning algorithm as the trained machine algorithm;
generating a set of updated operating electroforming parameters from the trained machine algorithm; and
operating the electroforming apparatus based on the set of updated operating electroforming parameters, wherein operating the electroforming apparatus comprises:
applying the applied electric current between the anode and the cathode in a presence of the electrolyte, and
depositing a plurality of metal layers on a surface of the cathode to form the component.

2. The method of claim 1, wherein the set of training electroforming parameters comprises an initial set of operating parameters of the electroforming apparatus and an initial thickness variation across a surface of the component formed by the electroforming process.

3. The method of claim 2, wherein the initial thickness variation is calculated by applying the initial set of operating parameters of the electroforming apparatus to a computational electrodeposition model.

4. The method of claim 2, wherein the set of initial operating parameters also comprises one or more of third coordinates of the anode, a third orientation state of the anode, fourth coordinates of the cathode, or a fourth orientation state of the cathode.

5. The method of claim 4, wherein the set of updated operating parameters comprises one or more of first updated coordinates of the anode, a first updated orientation state of the anode, second updated coordinates of the cathode, a second updated orientation state of the cathode, third updated coordinates of the shield, a third updated orientation state of the shield, fourth updated coordinates of the auxiliary electrode, a fourth updated orientation state of the auxiliary electrode, or an updated waveform characteristic of the applied electric current.

6. The method of claim 5, wherein operating the electroforming apparatus comprises moving, using a robotic assembly, one or more of the cathode, the anode, the auxiliary electrode, or the shield, based on one or more of the first updated coordinates of the anode, the first updated orientation state of the anode, the second updated coordinates of the cathode, the second updated orientation state of the cathode, the third updated coordinates of the shield, the third updated orientation state of the shield, the fourth updated coordinates of the auxiliary electrode, or the fourth updated orientation state of the auxiliary electrode.

7. The method of claim 5, wherein operating the electroforming apparatus comprises varying the applied electric current, using a programmable power supply, based on the updated waveform characteristic of the applied electric current.

8. The method of claim 1, wherein training the machine learning algorithm comprises maintaining a root mean square error of a thickness variation across a surface of the component, formed by the electroforming process, in a range from about 1 micrometer to about 200 micrometers.

9. The method of claim 1, wherein training the machine learning algorithm comprises:
training the machine learning algorithm based on a first subset of the set of training electroforming process parameters corresponding to the at least one simulated electroforming process;
validating the machine learning algorithm based on a second sub-set of the set of training electroforming process parameters corresponding to the at least one simulated electroforming process; and storing the validated machine learning algorithm as the trained machine algorithm.

10. A method of forming a component by an electroforming process using an electroforming apparatus comprising an anode, a cathode and an electrolyte comprising a metal salt, the method comprising:
receiving a set of training electroforming process parameters, the set of training electroforming process parameters including one or more of first coordinates of a shield, a first orientation state of the shield, second coordinates of an auxiliary electrode, a second orientation state of the auxiliary electrode, or a waveform characteristic of an applied electric current;
training, based on at least one simulated electroforming process, a machine learning algorithm based on at least a first subset of the set of training electroforming process parameters;
validating the machine learning algorithm based on a second subset of the set of training electroforming process parameters corresponding to the at least one simulated electroforming process;
generating a set of updated operating electroforming parameters from at least one of the training or the validating, wherein the set of updated operating parameters comprises one or more of first updated coordinates of the shield, a first updated orientation state of the shield, second updated coordinates of the auxiliary electrode, a second updated orientation state of the auxiliary electrode, or an updated waveform characteristic of the applied electric current; and
operating an electroforming apparatus based on the set of updated operating electroforming parameters, wherein operating the electroforming apparatus comprises:
moving, using a robotic assembly, the anode, based on the set of updated operating electroforming parameters,
applying the applied electric current between the anode and the cathode in a presence of the electrolyte, after each movement of the anode, and
depositing a plurality of metal layers on a surface of the cathode to form the component.

11. A system for electroforming a component, the system comprising:
an electroforming apparatus comprising an anode, a cathode, and an electrolyte comprising a metal salt; and
a controller operatively coupled to the electroforming apparatus, the controller comprising:
a memory storing one or more processor-executable routines and a machine learning algorithm; and
one or more processors to execute the one or more processor-executable routines which, when executed, cause acts to be performed comprising:
receiving a set of training electroforming process parameters, the set of training electroforming process parameters including one or more of first coordinates of a shield, a first orientation state of the shield, second coordinates of an auxiliary electrode, a second orientation state of the auxiliary electrode, or a waveform characteristic of an applied electric current;
training, based on at least one simulated electroforming process, a machine learning algorithm based on at least a subset of the set of training electroforming process parameters;

validating the machine learning algorithm based on a set of measured electroforming process parameters corresponding to at least one actual electroforming process;

generating a set of updated operating electroforming parameters from at least one of the training or the validating; and operating the electroforming apparatus based on the set of updated operating electroforming parameters, wherein operating the electroforming apparatus comprises:

applying the applied electric current between the anode and the cathode in a presence of the electrolyte, and depositing a plurality of metal layers on a surface of the cathode to form the component.

12. The system of claim 11, wherein the set of training electroforming parameters comprises a set of initial operating parameters of the electroforming apparatus and an initial thickness variation across a surface of the component formed by the electroforming process.

13. The system of claim 12, wherein the initial thickness variation is calculated by applying the set of initial operating parameters of the electroforming apparatus to a computational electrodeposition model stored in the memory.

14. The system of claim 12, wherein the set of initial operating parameters comprises one or more of third coordinates of the anode, a third orientation state of the anode, fourth coordinates of the cathode, or a fourth orientation state of the cathode.

15. The system of claim 14, wherein the set of updated operating parameters comprises one or more of first updated coordinates of the anode, a first updated orientation state of the anode, second updated coordinates of the cathode, a second updated orientation state of the cathode, third updated coordinates of the shield, a third updated orientation state of the shield, fourth updated coordinates of the auxiliary electrode, a fourth updated orientation state of the auxiliary electrode, or an updated waveform characteristic of the applied electric current.

16. The system of claim 15, further comprising a robotic assembly configured to move one or more of the cathode, the anode, the auxiliary electrode, or the shield, based on one or more of the first updated coordinates of the anode, the first updated orientation state of the anode, the second updated coordinates of the cathode, the second updated orientation state of the cathode, the third updated coordinates of the shield, the third updated orientation state of the shield, the fourth updated coordinates of the auxiliary electrode, or the fourth updated orientation state of the auxiliary electrode.

17. The system of claim 15, further comprising a programmable power supply configured to vary the applied electric current, based on the updated waveform characteristic of the applied electric current.

18. The system of claim 11, wherein training the machine learning algorithm comprises maintaining a root mean square error of a thickness variation across a surface of the component formed by the electroforming process in a range from about 1 micron to about 200 micrometers.

\* \* \* \* \*